United States Patent [19]

Matsumoto

[11] Patent Number: 4,465,150
[45] Date of Patent: Aug. 14, 1984

[54] DEVICE FOR CHARGING WEIGHED OUT ARTICLES INTO CONTAINER IN AUTOMATIC WEIGHING APPARATUS

[75] Inventor: Seishi Matsumoto, Tokyo, Japan

[73] Assignee: Kabushiki Kaisha Ishida Koki Seisakusho, Kyoto, Japan

[21] Appl. No.: 416,469

[22] Filed: Sep. 10, 1982

[30] Foreign Application Priority Data

Sep. 14, 1981 [JP] Japan .................. 56-145120

[51] Int. Cl.³ .............. G01G 19/22; B65B 1/04; B65B 3/04
[52] U.S. Cl. ........................ 177/25; 141/106; 141/244
[58] Field of Search .......... 177/25; 141/83, 106, 141/244, 248

[56] References Cited

U.S. PATENT DOCUMENTS 4,184,523 1/1980 Carrigan et al. ............. 141/238
4,308,928 1/1982 Oshima ..................... 177/25

FOREIGN PATENT DOCUMENTS 2267959 4/1974 France .

*Primary Examiner*—George H. Miller, Jr.
*Attorney, Agent, or Firm*—Staas & Halsey

[57] ABSTRACT

A device for smoothly charging weighed out articles from an automatic weighing apparatus into a container formed of a plurality of contiguous vessels or container sections. The charging device comprises a shutter plate mounted in close proximity to the upper surface of the container, a timing hopper having the shutter plate as a bottom and defining storage compartments in positions corresponding to respective ones of the container sections, and an allocation unit mounted between the timing hopper and a discharge opening of the automatic weighing apparatus. The allocation unit is operative to allocate the articles to respective ones of the storage compartments of the timing hopper once for each weighing operation performed by the automatic weighing apparatus. The shutter plate is opened upon termination of discharge of the articles into each of the storage compartments for introducing the articles into container sections associated with respective ones of the storage compartments.

3 Claims, 2 Drawing Figures

DEVICE FOR CHARGING WEIGHED OUT ARTICLES INTO CONTAINER IN AUTOMATIC WEIGHING APPARATUS

BACKGROUND OF THE INVENTION

This invention relates to a charging device for use with an automatic weighing apparatus of the combination computing type, in which articles weighed out by the automatic weighing apparatus are allocated sequentially into respective sections of a container awaiting at a predetermined charging position.

Such automatic weighing apparatus of the combination computing type has a plurality of weighing machines and operates by measuring the weights of articles charged into respective ones of said weighing machines, selecting the combination of articles that gives a total weight equal or closest to a present target weight, discharging the articles from selected ones of said weighing machines, replenishing the emptied weighing machines with new articles to be weighed, finding the next combination of articles to be discharged, and then repeating the foregoing cycle to continue the weighing out of articles in automatic fashion. Since the weighing apparatus of the combinatorial type performs its operation by electronic means, the weighing rate is so high that as many as sixty combinations can be obtained per minute by the process mentioned above. Therefore, when there is only one discharge opening for the articles in the automatic weighing apparatus, assuming that the containers must be transferred separately to the predetermined charging position below said discharge opening, the time necessary to transfer the containers to the charging position represents dwell time for the weighing machines, so that the charging or packaging rate cannot keep up with the weighing rate.

Recently, tray-like containers made of plastic or aluminium foil material have come into greater use for packaging confectioneries or like articles. These containers are obtained by injection or deep drawing and, when molded in this manner, are formed integrally of a plurality of contiguous vessels or container sections. Therefore, since the automatic weighing apparatus has only one discharge opening, it is necessary to sever the container into the respective sections and place them on a belt conveyor or the like for transferring them to the charging position, or to shift the container on the belt conveyor to transfer a new empty container section to the charging position for each measurement performed by the automatic weighing apparatus, the container not being cut into individual sections. In the former case, since the container is cut into individual sections, it is necessary to seal the upper surface of each container section, with a resultant increase in the number of operational steps. In the latter case, it is necessary to transfer each container section to the charging position for each combinatorial weighing operation. Thus the time necessary for such shifting represents dwell time for the automatic weighing apparatus, so that the rate of charging or packaging cannot keep pace with the rate of weighing.

BRIEF SUMMARY OF THE INVENTION

It is therefore an object of the present invention to provide a device for charging articles into a container for use with a high speed automatic weighing apparatus having only one discharge opening, wherein the articles supplied from the automatic weighing apparatus can be smoothly charged into the container.

It is another object of the present invention to provide a device for charging articles into a container for use with a high speed automatic weighing apparatus, wherein the articles supplied from the automatic weighing apparatus may be sequentially allocated to and introduced into respective ones of the integral sections of the container.

It is another object of the present invention to provide a device for charging articles into a container for use with a high-speed automatic weighing apparatus, wherein a shutter plate is mounted proximate to the upper surface of the container to serve as the bottom of a timing hopper which is provided with a plurality of storage compartments associated with respective ones of said container sections, and wherein the articles weighed out by the automatic weighing apparatus are discharged from the discharge opening thereof and allocated to respective ones of said storage compartments.

It is yet another object of the present invention to provide a device for charging articles into a container for use with a high-speed automatic weighing apparatus, wherein the weighed out articles supplied from the discharge opening of the automatic weighing apparatus may be allocated sequentially to respective ones of the contiguous storage compartments for each combinatorial weighing operation performed by the automatic weighing apparatus, and wherein the shutter plate is opened when the articles have been allocated to all of the compartments for introducing the weighed out articles into respective ones of the container sections associated with said compartments.

Other features and advantages of the invention will be apparent from the following description taken in connection with the accompanying drawings.

DESCRIPTION OF THE PREFERRED EMBODIMENT

Figure 1:
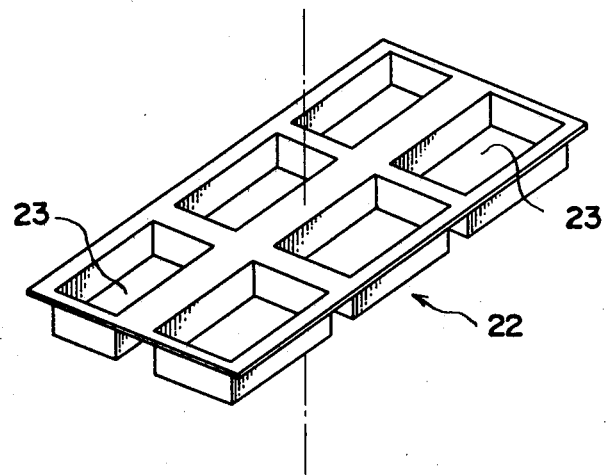
FIG. 1 is a perspective view of the container formed of plural contiguous sections and used in a charging device of the present invention operatively associated with an automatic weighing apparatus.

FIG. 1 is a perspective view showing a container 22 formed of six contiguous vessels or container sections 23.

Figure 2:
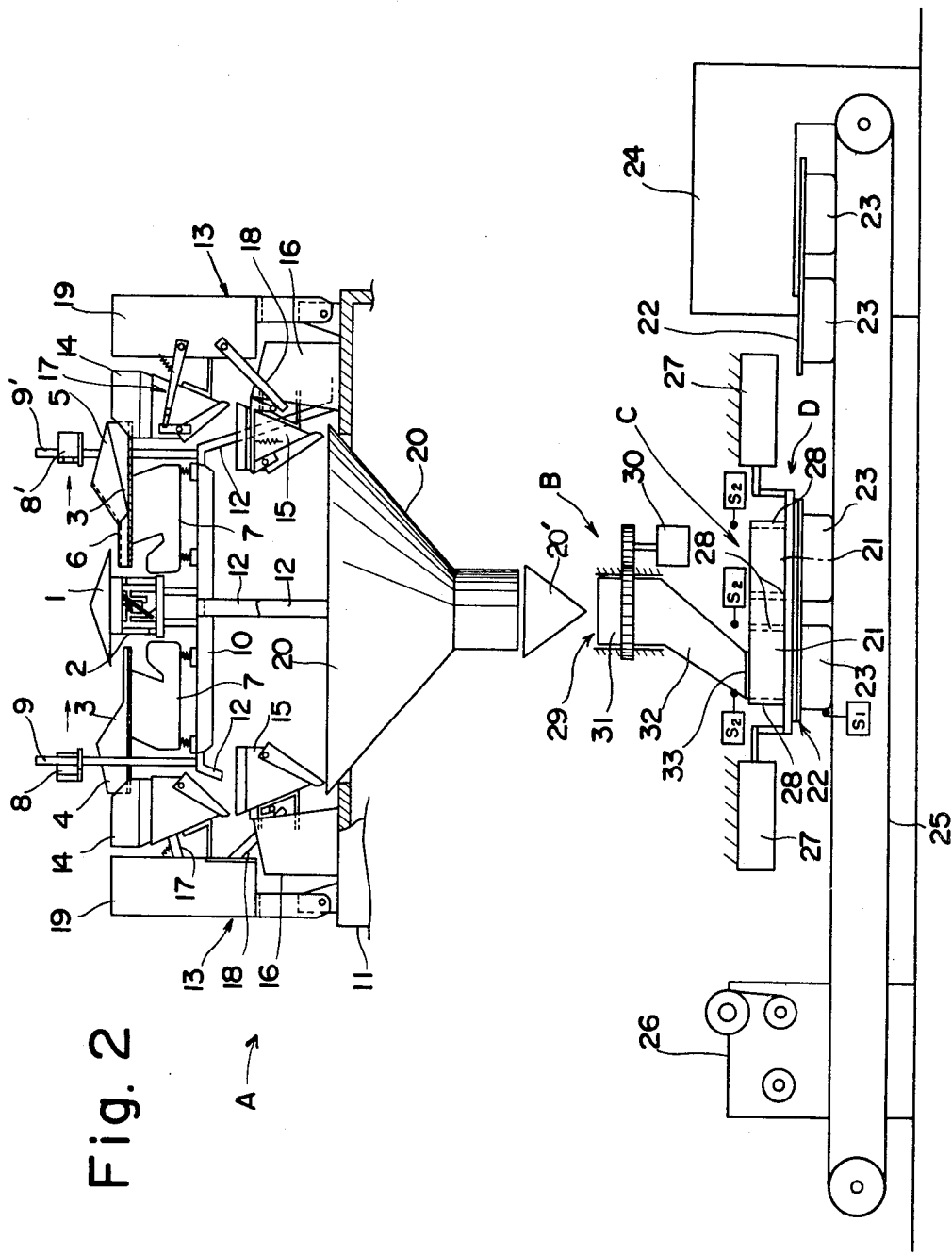
FIG. 2 is a side elevation of the charging device of the present invention operatively associated with an automatic weighing apparatus.

Referring to FIG. 2, A represents an automatic weighing apparatus of the type which will be described below. Disposed so as to receive articles weighed out and discharged from the automatic weighing apparatus A is a charging device in accordance with the present invention, comprising an allocation unit B for allocating articles discharged from the unit A to a plurality to storage compartments 21 for transient storage therein, a timing hopper C defining the storage compartments 21, and a shutter plate D forming a bottom of the timing hopper C.

In the automatic weighing apparatus A, numeral 1 designates a conically shaped disribution table supported on an electro-magnetically operated vibrator 2. Numeral 3 designates a plurality of radial supply troughs disposed around the distribution table 1, each supply trough having a radially inner end positioned below and adjacent to the outer peripheral edge of the distribution table. Only two of the supply troughs 3 are shown in the side elevation of FIG. 2. Each supply trough 3 has a radial passage defined by an angularly edged vertical wall 4 and another vertical wall composed of an angularly edged and outwardly inclined wall portion 5 which extends two-thirds of the wall and an outwardly inclined wall portion 6 which extends one-third of the wall along the vertical wall 4 of the adjacent supply trough. The inclined wall portions 5, 6 have portions extending in overhanghing relation to the vertical wall of the adjacent supply trough 3 for avoiding direct mechanical contact therewith. Each of the supply troughs 3 is supported on an electro-magnetically operated vibrator 7, with the vibrators 2 and 7 being supported on a common support table 10 secured on a plurality of support posts 12 secured in turn to a frame 11. A support post 9 fitted with a light projector 8 and another support post 9' fitted with a light receiver 8' are secured on the support table 10 in symmetrical relation to the distribution table 1. Numeral 13 designates a plurality of weighing machines each of which is made up of a pool hopper 14 for receiving articles delivered from the troughs 3, a weighing hopper 15 adapted to receive the articles from the pool hopper 14, a weighing mechanism 16 adapted to weigh the articles contained in the hopper 15, and a driving part 19 adapted to open or close the pool hopper 14 and the weighing hopper 15 by means of levers 17, 18. Each supply trough has its foremost part projecting into the pool hopper 14 associated therewith so that the articles supplied from the trough 3 may be introduced into said pool hopper 14. Numeral 20 designates a funnel-shaped collecting chute having its upper opening projecting slightly from the upper surface of the frame 11 for collecting the articles discharged from the weighing hoppers 15 of the weighing machines 13 and supplying them to the allocation unit B.

The allocation unit B is made up of an allocating chute 29 for allocating the articles from the chute 20, and a drive unit 30 for driving the chute in rotation. The chute 29 is constituted by an inlet portion 31 for receiving the articles discharged from a terminal pool hopper 20' and a guide portion 32 for guiding the articles in predetermined directions. The inlet portion 31 is fulcrumed by suitable means for rotation about an axis passing through the center of the timing hopper C and of the container 22. The guide portion 32 has its discharge opening 33 adjacent to the upper surface of the timing hopper C and is reduced in cross-section to one half to one fourth of the surface measure of the storage compartment 21. The opening 33 is offset from the center of rotation by a distance corresponding to such reduction in cross section so that the articles supplied into the allocation unit may be injected only into one of the storage compartments as determined in the charging sequence.

The driving unit 30 is so designed and constructed that the allocating chute 29 is driven thereby into partial rotation with a certain delay measured from the opening of the pool hopper 20', that is, after injection of one article into one compartment 21, and so that the chute 29 may be brought in the course of such rotation to a rotary position in such a manner that the chute 29 communicates only with the compartment 21 neighboring the first-stated compartment 21, whereupon such rotary position is sensed by one of a plurality of limit switches S2 to halt rotation of the chute 29. The number of signals supplied from the respective limit switches S2 provided at such positions of communication with the respective storage compartments 21 are counted to sense that the chute 29 has made the round of the respective compartments 21, that is, that the totality of the articles to be supplied to the container 22 has been stored in the timing hopper C. A signal is then issued to drive the shutter plate D.

Numeral 22 designates the container, shown in FIG. 1, obtained upon deep drawing aluminium foil or the like. The container 22 is formed of six contiguous sections 23 in two rows and manufactured by a deep drawing unit 24 provided in close proximity of the charging device. Numeral 25 designates a conveyor for intermittently supplying the containers 22 to the charging position below the automatic weighing device. Numeral 26 designates a sealing device for sealing the upper surface of the container 22 as with a film after the articles have been charged into the container.

The shutter plate D is mounted to overlie the upper surface of the container 22 which has been stopped in the charging position and opened or closed by a hydraulic or pneumatic cylinder 27. The cylinder 27 may be started upon reception simultaneously of a first signal from the limit switch S1 indicating that the container 22 has been transferred to the charging position and a second signal from the limit switch S2 indicating that the allocation unit B has completed its allocating operation.

The timing hopper C is a small size version of the container 22 and has the same number of storage compartments 21 as that of the sections 23. The storage compartments 21 are defined by partition plates 28 as side walls and the shutter plate D as the bottom wall. By having the storage compartments 21 coincident in their positions with the container sections 23, the articles stored transiently in the storage compartments 21 may be supplied into the respective sections 23.

In operation, the articles supplied on the distribution table 1 are distributed to the supply troughs 3 by the operation of the vibrator 2. The troughs 3 are also set into oscillation by the vibrators 7 so that the articles on the troughs 3 may be introduced into the pool hoppers 4 and thence into the weighing hoppers 15 where they are weighed and the resulting weight values are processed by an electronic circuit which performs combinatorial computations. In this manner, the combination of articles that gives a total weight equal or closest to a preset weight is selected and the weighing hoppers 15 corresponding to such combination are opened so that the articles contained in these hoppers are discharged into the chute and thence transferred to the pool hopper 20'.

The articles which have been weighed out and stored in the pool hopper 20' are supplied into chute 29 of the allocation unit B by a signal delivered from the weighing mechanism 16 upon closure of the weighing hopper 15. The articles are further supplied into compartments 21 of the timing hopper C, then communicating with chute 29, and are stored there transiently. During this time, the next weighing operation is carried out, while the chute 29 is driven into rotation by the driving unit 30 through a predetermined angle until its is stopped at a position communicating with the adjacent storage compartment 21. The articles which have been weighed out in the second weighing operation are introduced into this compartment 21. The weighing and charging operation is carried out in the above manner and, ultimately, the limit switch S2 senses that the chute 29 has made the round of the compartments 21 and the articles have been charged into all of the storage compartments. The cylinder 27 is set into operation upon receiving a signal supplied from the limit switch S2 and the signal supplied from the aforementioned limit switch S3 simultaneously for opening the shutter plate D and introducing the articles stored in the compartments 21 into the sections 23 of the container 22 associated with such compartments. The container 22 is then transferred to the sealing unit 26 where the container is sealed on the upper surface thereof with a film, while the next empty container 22 is transferred to the operative position in the charging device. The above process is repeated for each container supplied to the charging device.

Though the chute 29 is designed in the above embodiment to perform rotational movement, it may also perform linear or curved reciprocating movement or a reciprocating movement consisting of a combination of curved and linear movements depending upon the shape and mode of connection of the container sections 23 of the container 22.

According to the present invention as described and illustrated above, there are provided a shutter plate near the upper surface of the container being transferred to the charging position and the timing hopper whose bottom plate is the aforementioned shutter plate and which has the same number of storage compartments as the container sections of the container. There is also provided an allocation unit having a discharge opening for the weighed out articles and orientable for each weighing operation to one of the storage compartments. When the respective compartments have been filled with the weighed out articles, the shutter plate is opened for introducing the articles into the respective container sections. In this manner, even when the automatic weighing device has only one outlet for the articles, the time necessary for introducing the containers to their operative position may be minimized, resulting in less dwell time and a higher article weighing rate.

In addition, the container can be introduced in-situ into the charging unit without being cut into individual sections, thus making it possible to simplify the ensuing sealing operation.

As many apparently widely different embodiments of the present invention can be made without departing from the spirit and scope thereof, it is to be understood that the invention is not limited to the specific embodiments thereof except as defined in the appended claims.

What I claim is:

1. In conjunction with an automatic weighing apparatus, a device for charging weighed out articles from the automatic weighing apparatus into a container consisting of a plurality of integral and contiguous sections, said device comprising, in combination, a shutter plate mounted in close proximity to the upper surface of the container, a timing hopper having said shutter plate as a bottom and defining storage compartments in positions corresponding to respective ones of said container sections, and an allocation unit mounted between said timing hopper and a collecting chute or a terminal pool hopper as a discharge opening of the automatic weighing apparatus.

2. The charging apparatus as claimed in claim 1, in which said allocation unit is operative to allocate the articles to respective ones of said storage compartment of said timing hopper one for each weighing operation performed by the automatic weighing apparatus.

3. The charging apparatus as claimed in claim 1, in which said shutter plate is opened upon termination of discharge of the articles into each of said storage compartments for introducing the articles into container sections associated with respective ones of said storage compartments.

* * * * *

UNITED STATES PATENT AND TRADEMARK OFFICE
CERTIFICATE OF CORRECTION

PATENT NO. : 4,465,150           Page 1 of 2

DATED : August 14, 1984

INVENTOR(S) : Seishi Matsumoto

It is certified that error appears in the above-identified patent and that said Letters Patent is hereby corrected as shown below:

Col. 1, line 12, "awaiting" should be --waiting--.

Col. 2, line 59, "to" (2nd occurrence) should be -- of --.

Col. 3, line 12, "overhanghing" should be --overhanging--;
line 52, "measure" should be --area--;
line 60, "into" should be --in stepped--;
line 63, "and so" should be --such--;
line 65, "rotary" should be --rotated--;
line 67, "rotary" should be --rotated--.

Col. 4, line 1, "to halt" should be --in response to which driving unit 30 halts--;
line 3, before "with" insert --of the chute 29--;
line 11, "upon" should be --by--;
line 23, after "and" insert --is--;
line 28, after "the" insert --last--;
line 34, after "28" insert --which function--;
line 35, after "D" insert --which functions--.
line 59, "compartments" should be --the compartment--;
line 63, "into" should be --in stepped--;
line 64, "its" should be --it--.

Col. 5, line 1, "and" should be --until--;
line 2, before "limit" insert --last--;
line 6, before "limit" insert --last--;
lines 7 and 8, "S3 simultaneously" should be --S1--.

UNITED STATES PATENT AND TRADEMARK OFFICE
CERTIFICATE OF CORRECTION

PATENT NO. : 4,465,150
DATED : August 14, 1984
INVENTOR(S) : Seishi Matsumoto

It is certified that error appears in the above-identified patent and that said Letters Patent is hereby corrected as shown below:

Col. 6, line 15, "from" should be -- discharged from a discharge opening of --;

line 24, "chute" should be -- chute, --;
       line 25, "hopper as a" should be -- hopper, at the--;
       line 30, "hopper" should be -- hopper, --.

Signed and Sealed this

Eighteenth Day of June 1985

[SEAL]

Attest:

DONALD J. QUIGG

Attesting Officer      Acting Commissioner of Patents and Trademarks